(12) United States Patent
Nishimoto

(10) Patent No.: US 10,649,672 B1
(45) Date of Patent: May 12, 2020

(54) OFFLOADING DEVICE MAINTENANCE TO AN EXTERNAL PROCESSOR IN LOW-LATENCY, NON-VOLATILE MEMORY

(71) Applicant: EMC IP Holding Company LLC, Hopkinton, MA (US)

(72) Inventor: Michael Nishimoto, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/087,950

(22) Filed: Mar. 31, 2016

(51) Int. Cl.
| G06F 12/00 | (2006.01) |
| G06F 12/08 | (2016.01) |
| G06F 13/00 | (2006.01) |
| G06F 3/06 | (2006.01) |
| G06F 13/40 | (2006.01) |
| G06F 13/42 | (2006.01) |

(52) U.S. Cl.
CPC .......... *G06F 3/0619* (2013.01); *G06F 3/0647* (2013.01); *G06F 3/0652* (2013.01); *G06F 3/0688* (2013.01); *G06F 13/4068* (2013.01); *G06F 13/4282* (2013.01); *G06F 2213/0026* (2013.01)

(58) Field of Classification Search
CPC ................................. G06F 12/00; G06F 12/08
USPC ........................................................ 711/103
See application file for complete search history.

(56) References Cited

U.S. PATENT DOCUMENTS

| 8,959,307 | B1* | 2/2015 | Bruce | G06F 3/0611 |
| | | | | 711/170 |
| 9,424,131 | B2* | 8/2016 | Tang | G06F 11/1012 |
| 2002/0167844 | A1* | 11/2002 | Han | G11C 16/10 |
| | | | | 365/185.28 |
| 2009/0089492 | A1* | 4/2009 | Yoon | G06F 13/1689 |
| | | | | 711/103 |
| 2012/0081958 | A1* | 4/2012 | Lee | H01L 23/50 |
| | | | | 365/185.05 |
| 2013/0304982 | A1* | 11/2013 | Jung | G11C 11/40622 |
| | | | | 711/106 |
| 2013/0339574 | A1* | 12/2013 | Franceschini | G06F 12/0246 |
| | | | | 711/103 |
| 2015/0199268 | A1* | 7/2015 | Davis | G06F 12/0246 |
| | | | | 711/103 |
| 2016/0179406 | A1* | 6/2016 | Gorobets | G11C 29/70 |
| | | | | 711/103 |
| 2016/0239460 | A1* | 8/2016 | Ziakas | G06F 11/108 |
| 2017/0075593 | A1* | 3/2017 | Kim | G06F 3/0679 |
| 2017/0269992 | A1* | 9/2017 | Bandic | G06F 11/108 |

OTHER PUBLICATIONS

CNET, Intel, Micron debut 3D XPoint storage technology 1,000x faster than current SSDs, Jul. 28, 2015.*

* cited by examiner

*Primary Examiner* — Mohamed M Gebril
(74) *Attorney, Agent, or Firm* — Van Pelt, Yi & James LLP

(57) ABSTRACT

A set of device maintenance related data is received from each of a plurality of non-volatile memory modules. Each of the plurality of non-volatile memory modules comprise a plurality of non-volatile memory devices. Based at least in part on said set of device maintenance related data a maintenance operation to be performed is determined. The determined device maintenance related operation is performed.

19 Claims, 5 Drawing Sheets

OFFLOADING DEVICE MAINTENANCE TO AN EXTERNAL PROCESSOR IN LOW-LATENCY, NON-VOLATILE MEMORY

BACKGROUND OF THE INVENTION

Recent advances in non-volatile memory provide low-latency performance over traditional flash-based non-volatile memory. A tradeoff may be technical challenges in using such low-latency non-volatile memory, such as device maintenance.

BRIEF DESCRIPTION OF THE DRAWINGS

Various embodiments of the invention are disclosed in the following detailed description and the accompanying drawings.

DETAILED DESCRIPTION

Figure 1:
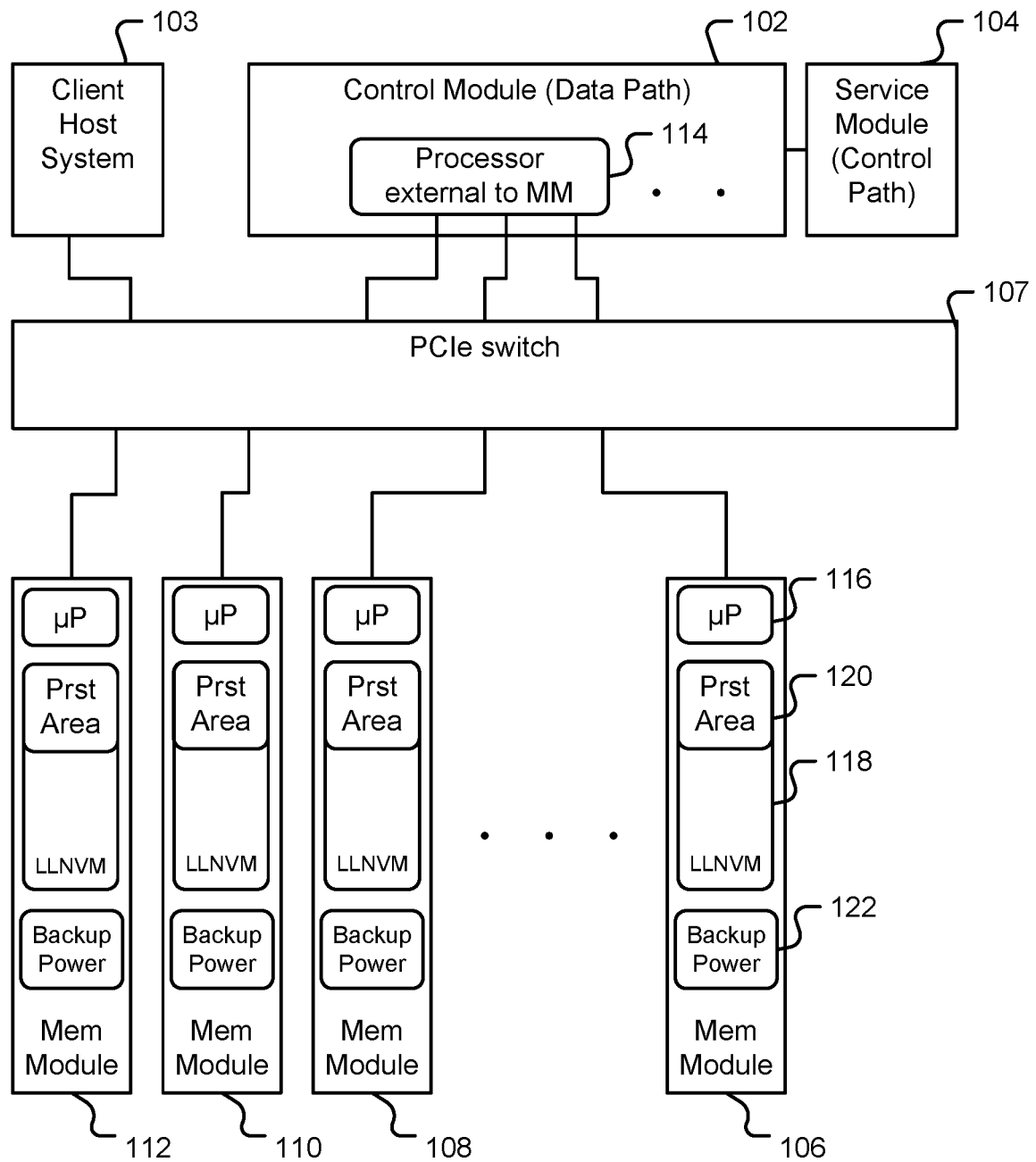
FIG. 1 is a block diagram illustrating an embodiment of a system for data storage.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Device maintenance in non-volatile memory is disclosed. In one embodiment, an external processor is used to offload device maintenance. Throughout this specification, a processor is considered an "external processor" if it is used to globally perform device maintenance over a plurality of memory devices and is external to the memory modules containing those memory devices.

In one embodiment, a data storage system comprises a plurality of memory devices to increase performance by parallelizing access across devices and/or increase reliability by distributing parity across devices. An external processor may be used to govern control to the data storage system. Client/host access to data on devices does not necessarily pass through the external processor.

In one embodiment, a low-latency non-volatile memory may include Micron 3D) XPoint memory, a memory technology that is a transistorless and/or resistive-based memory.

In one embodiment, a low-latency non-volatile memory provides the following advantages over flash memory:
 data on media may be overwritten in place subject to a block size, unlike flash memory which requires blocks to be erased before they can be rewritten;
 more than 1000 times lower latency than flash memory; and
 greater endurance and/or wear resistance than flash memory.

The following device maintenance requirements of such a memory may comprise:
 wear-leveling using write-in-place migration within a device or across a plurality of devices;
 "scrubbing" of physical data to track how well the device media is retaining data prior to error detection and/or error correction techniques; and
 physical location "disturb" tracking wherein a read and/or write access may disturb one of the physically adjacent cells.

By placing devices in parallel, other device maintenance requirements include training a device on a orderly shutdown when power is removed from the device, for example during "hot swap".

FIG. 1 is a block diagram illustrating an embodiment of a system for data storage. The system in FIG. 1 comprises three types of modules: one or more control modules (102) (shown as one control module without limitation in FIG. 1), one or more service modules (104) (shown as one service module without limitation in FIG. 1), and a plurality of memory modules (106), (108), (110), (112). Each memory module comprises multiple memory devices. One or more client/host systems (103) is coupled to the data storage system using a PCIe switch/fabric (107) which connects the processor (114) with each memory module as well (106)-(112). A system bus couples the control module (102) to each memory device (106), (108), and in one embodiment a high performance standard such as x4-lane PCIe Gen3 is used. For high performance, read data sent back to a client (103) does not necessarily pass through the control module (102), and write data sent from clients to memory modules (106), (108), (110), (112) do not necessarily pass through the control module (102).

In one embodiment, the control module (102) controls the data path between a user and/or host and one or more memory modules (106), (108). The control module comprises an external processor (114) to govern the data path and provide device maintenance for the plurality of memory modules (106), (108).

In one embodiment, each memory module (106) includes a microprocessor (116), the low-latency non-volatile memory media (118) including an area for hot-swap and/or persistent algorithms (120), and a backup power source (122) for executing persistent algorithms before shutdown. In one embodiment, the microprocessor (116) is configured to send maintenance related data to the external processor (114) and/or is configured to execute persistent algorithms. In one embodiment and without limitation, a system in FIG. 1 may have between 36 memory modules and two memory modules (106), (108). Throughout this specification, a microprocessor (116) can be comprised of a single or multiple devices which can execute algorithms. Such devices might include but not be limited to: a CPU device, an FPGA (field-programmable gate array), an ASIC (application-specific integrated circuit).

Figure 2:
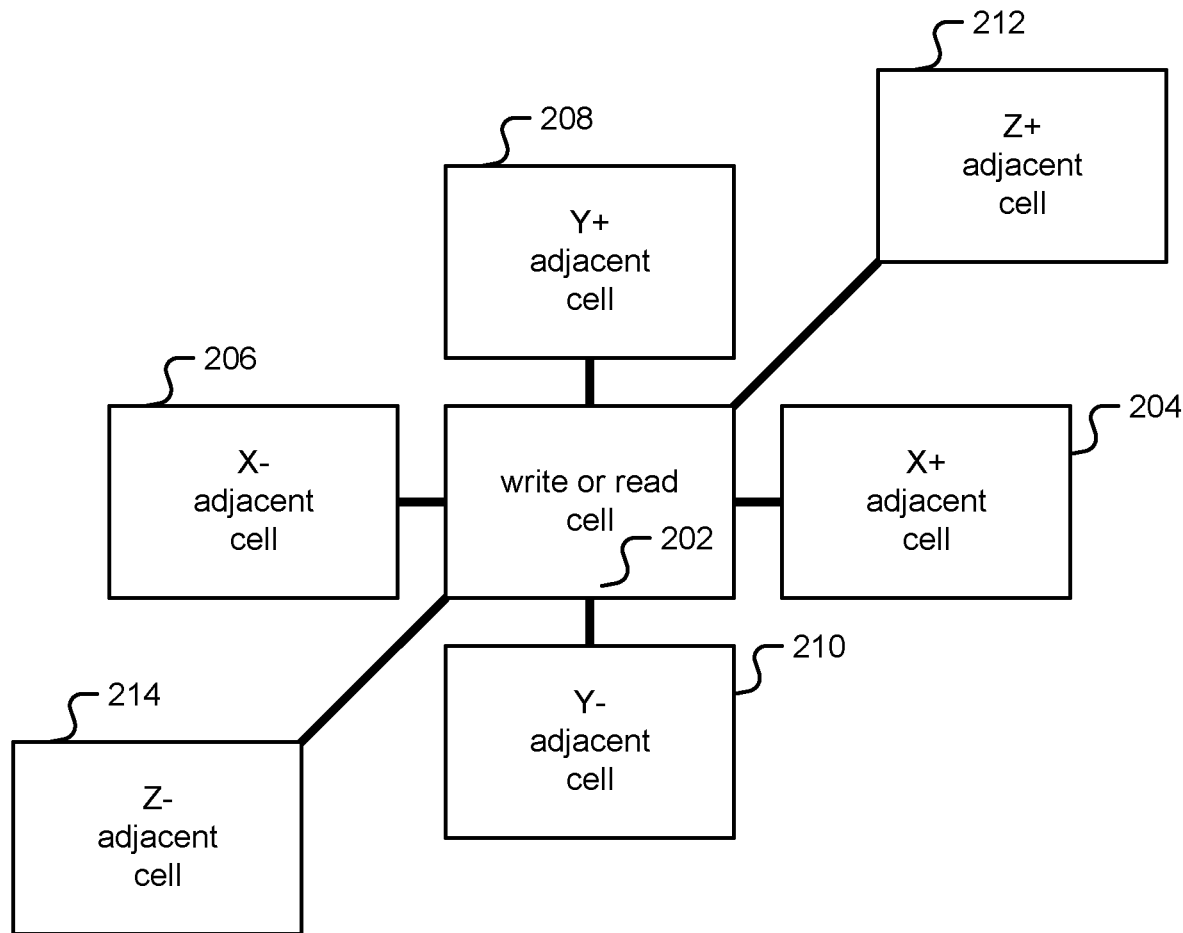
FIG. 2 is an illustration of adjacent cells in a low-latency non-volatile memory media.

FIG. 2 is an illustration of adjacent cells in a low-latency non-volatile memory media.

In one embodiment, a read access to given cell (202) may affect the payload of the cell (202) and/or one or more physically adjacent cells. For example for Micron 3D XPoint memory, cells are adjacent in three-dimensions, such that there are near neighbors along the: X-axis, shown as an X+ adjacent cell (204) and X− adjacent cell (206); Y-axis, shown as a Y+ adjacent cell (208) and Y− adjacent cell (210); and Z-axis, shown as a Z+ adjacent cell (212) and Z− adjacent cell (214). The phenomena where reading a cell (202) may cause errors in its adjacent cells is termed throughout this specification as "read disturb". Reading from cell (202) will cause the read disturb counts in cells (204), (206), (208), (210), (212), (214) to increase. The phenomena where reading a cell (202) may eventually cause wear out of that cell itself is called "read endurance". Reading from cell (202) increases the read endurance count in cell (202).

Similarly, a write access to given cell (202) may affect all physically adjacent cells such as along the: X-axis, shown as an X+ adjacent cell (204) and X− adjacent cell (206); Y-axis, shown as a Y+ adjacent cell (208) and Y− adjacent cell (210); and Z-axis, shown as a Z+ adjacent cell (212) and Z− adjacent cell (214). The phenomena where writing a cell (202) may cause errors in its adjacent cells is termed throughout this specification as "write disturb". Writing to cell (202) will cause the write disturb counts in cells (204), (206), (208), (210), (212), (214) to increase. The phenomena where writing a cell (202) will eventually lead to wear out of that cell is called "write endurance". Writing to cell (202) increases the write endurance count in cell (202).

There are different ways to perform device maintenance with regards to read disturb and write disturb. In one embodiment, every cell's read disturb and write disturb counts are maintained in the module's memory. Read disturb and write disturb counts for a particular cell are increased when an adjacent cell is read from or written to, respectively. In one embodiment, when a read or write occurs to a cell (202), an algorithm compares the new read disturb/write disturb counts in its nearest neighbors against a table with location-dependent, dynamic count limits. The location-dependent, dynamic count limits are updated by the external processor (114) over time as needed and may consider any of the following details but not limited to: location of the cell on the device, temperature of the devices, version of 3D XPoint media. If the read/write disturb counts of any neighboring cells are over the limit found in the previously discussed table, all data in the blocks containing neighboring cells must be read and then rewritten to their original block address. In one embodiment, after a block is re-written, the read and write disturb counts for all cells in the block can be set to zero. In one embodiment, device maintenance for read disturb and write disturb may be entirely processed on the memory module and not involve an external processor (114).

Figure 3:
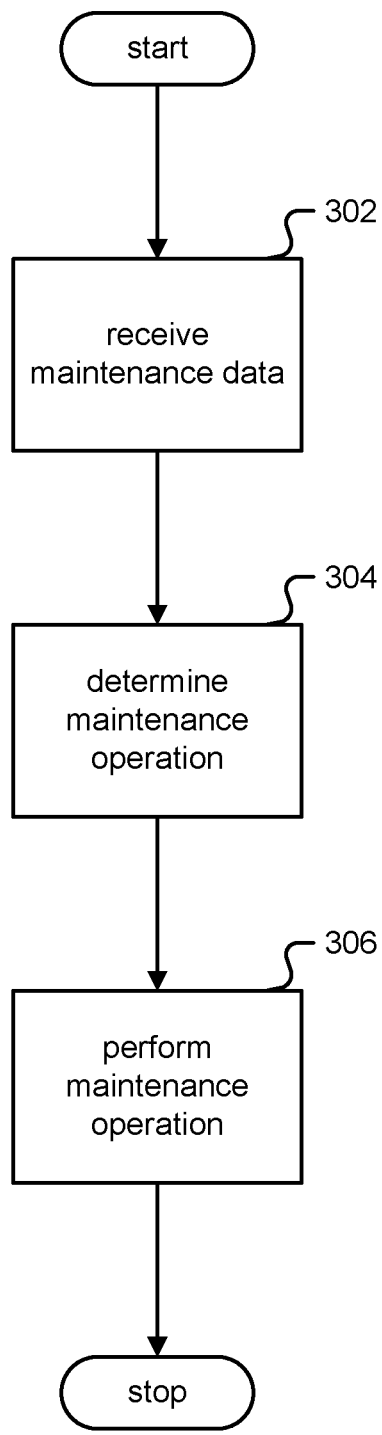
FIG. 3 is a flow chart illustrating an embodiment of a process for a data storage system.

FIG. 3 is a flow chart illustrating an embodiment of a process for a data storage system. In one embodiment, the processes of FIG. 3 are carried out by the external processor (114) in FIG. 1.

In step 302, maintenance data is received. In one embodiment, the control module (102) comprising the external processor (114) receives from each of the non-volatile memory modules (106), (108) a set of device maintenance related data.

In step 304, one or more maintenance operations are determined. In one embodiment, based at least in part on the set of device maintenance related data, a maintenance operation to be performed is determined. With its global perspective and understanding of the entire system layout, the external processor (114) may optimize and otherwise determine a maintenance operation plan for each individual memory module (106), (108) that best maintains the system of FIG. 1 as a whole. In step 306, the determined maintenance operation is performed. An example in step 504 of FIG. 5 will be described further below; by considering wear-leveling data and other data across modules, the external processor may, for example, decide while scrubbing to migrate data from one module to another.

Figure 4:
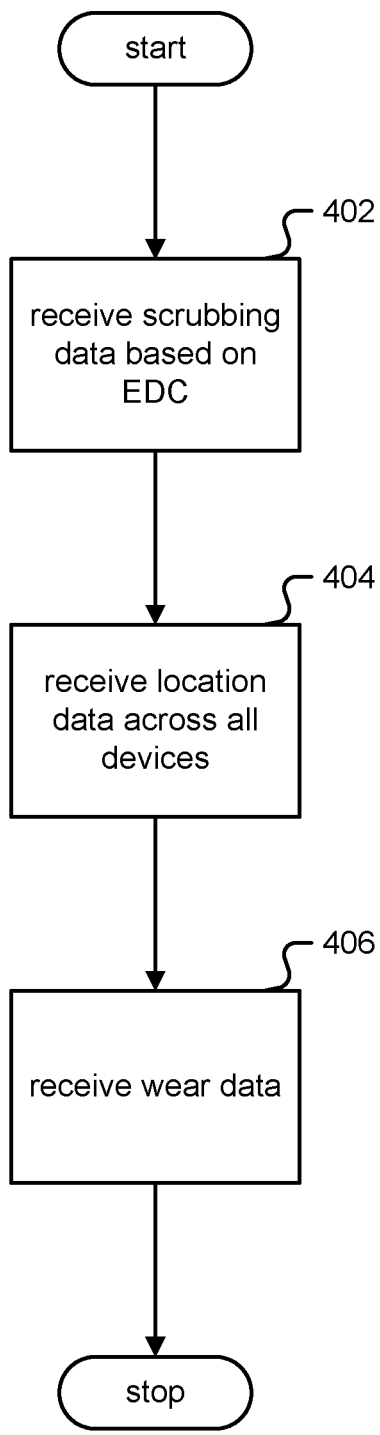
FIG. 4 is a flow chart illustrating an embodiment of a process for receiving maintenance data.

FIG. 4 is a flow chart illustrating an embodiment of a process for receiving maintenance data. In one embodiment, the process of FIG. 4 is included in (302) of FIG. 3.

In step 402, scrubbing data based on error detection and correction (EDC) is received. In one embodiment, a microprocessor (116) determines if and how much error correction has been exercised on memory media (118). In one embodiment, direct comparison of media before EDC is made with media after EDC, or error-correcting code (ECC) logic engines such as parity and/or syndrome engines are queried and/or tracked to indicate when and how much ECC is exercised. In one embodiment, defect maps and/or correlations are tracked to determine bit rot in relation to physical media. In one embodiment, scrubbing data received would eventually result in migration of data with a large enough problem.

In step 404, location data of objects across all memory modules (106), (108), (110), (112) is received. Without limitation, objects refer to any storage object including a physical memory object such as a bit, byte, page, and block, and/or a logical object such as a filesystem file, directory, superblock, swapfile, multimedia data, database journal, and app. In one embodiment, location data of objects is tracked down to the cell (202) to track adjacent cells (204)-(214).

In step 406, wear data is received. In one embodiment, wear data may comprise location data such as in step 404, wear statistics, and translation tables between physical address and logical address. Wear statistics may comprise read endurance and write endurance counts.

Figure 5:
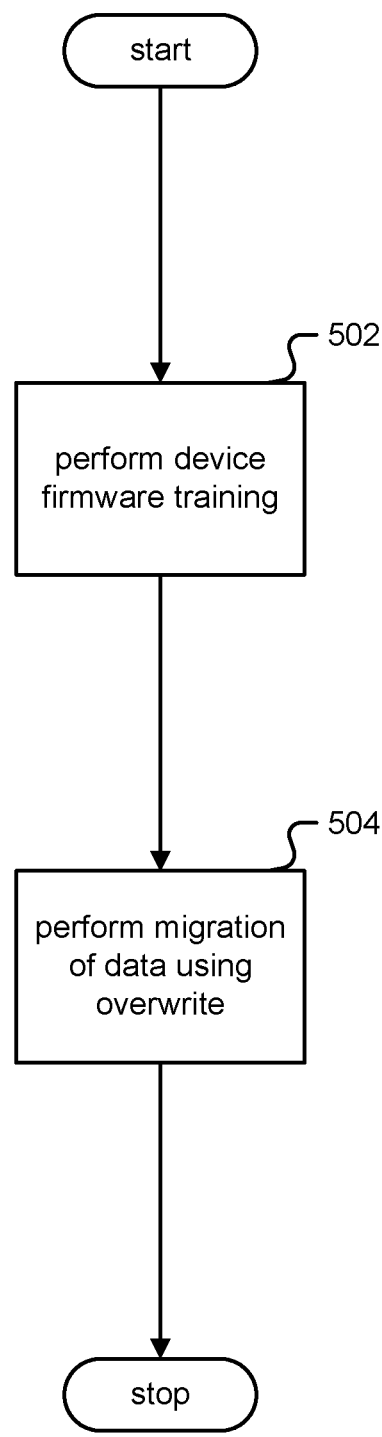
FIG. 5 is a flow chart illustrating an embodiment of a process for performing device maintenance operations.

FIG. 5 is a flow chart illustrating an embodiment of a process for performing device maintenance operations. In one embodiment, the process of FIG. 5 is included in (306) of FIG. 3.

In step 502, device firmware training is performed. In one embodiment, the external processor (114) trains one or more microprocessors (116) with a persistence algorithm. This training may be dynamic; that is, it may change over time/space and be proactive/reactive to external conditions including one or more of: host/user conditions, physical/environmental conditions, network conditions, device conditions/performance, security/retention conditions, and information/data conditions/types. The training may also include an addition, change, and/or reduction of persistence area (120) within the memory media (118).

When a memory module (106) is pulled out of the memory storage system backplane of FIG. 1 or power is disabled to the memory module for any reason, the backup power source (122) gives the trained microprocessor (116) time to execute the persistence algorithm/instructions associated with the persistence area (120). A persistence algorithm may include redundancy instructions. An example of a redundancy instruction is to write important data, for example, important user data and/or operating system data, to no less than three physical locations on the device during a power shutdown.

In step 504, migration of data is performed. Migration data may correspond to part of an object or an entire object. Unlike flash memory, non-volatile memory may be rewritten block-by-block with rewrite-in-place. Thus, a migration policy may be to migrate data within a memory module (106) or between memory modules (106), (108) based at least in part on the maintenance data, including one or more of the following: scrubbing data (402) indicating bit rot before EDC; location data (404) indicating read disturb and/or write disturb of a cell (202) or its adjacent neighbors (204)-(214); wear data including wear leveling data (406); temperature of the devices.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A data storage system, comprising:
   a control module connected to each non-volatile memory module in a plurality of non-volatile memory modules each comprising a plurality of low-latency non-volatile memory devices, wherein the control module comprises a processor external to said non-volatile memory modules, the processor being configured to:
   receive from each of said non-volatile memory modules a set of device maintenance related data, wherein the set of device maintenance related data includes a write disturb count for each cell of a plurality of cells of a low-latency non-volatile memory device;
   determine based at least in part on said set of device maintenance related data a maintenance operation to be performed, comprising to:
      determine whether a write disturb count of a neighboring cell of a cell exceeds or is equal to a count limit, wherein the count limit is selected based on a first neighboring cell or a second neighboring cell, wherein the count limit is updated based on a location of the neighboring cell on the low-latency non-volatile memory device, a temperature of the low-latency non-volatile memory device, and a version of 3D media; and wherein the neighboring cell is an adjacent cell of the cell; and
      in response to a determination to that the write disturb count of the neighboring cell of the cell exceeds or is equal to the count limit, determine that the maintenance operation is to be performed; and
   perform the maintenance operation, comprising to:
      read data in a block including the neighboring cell; and
      re-write the data into the block at an original block address of the block.

2. The system recited in claim 1, wherein the external processor is connected by a PCIe bus to said non-volatile memory modules.

3. The system recited in claim 2, wherein each of the plurality of low-latency non-volatile memory devices has internal data which may be overwritten in place.

4. The system recited in claim 3, wherein each non-volatile memory module further comprises a module microprocessor, and wherein the module microprocessor is configured to send module maintenance related data.

5. The system recited in claim 4, wherein the external processor is further configured to send to each module microprocessor associated with each non-volatile memory module persistence training.

6. The system recited in claim 5, wherein persistence training includes a persistence algorithm in an event non-volatile memory module power is lost.

7. The system recited in claim 6, wherein the persistence algorithm includes redundancy instructions.

8. The system recited in claim 7, wherein the maintenance operation comprises scrubbing.

9. The system recited in claim 8, wherein said set of device maintenance related data comprises scrubbing data.

10. The system recited in claim 9, wherein said scrubbing data comprises an indication related to how much error correction has been exercised.

11. The system recited in claim 10, wherein the control module runs software on an external processor.

12. The system recited in claim 11, wherein the maintenance operation is determined across two or more non-volatile memory modules.

13. The system recited in claim 12, wherein said set of device maintenance related data comprises wear data.

14. The system recited in claim 13, wherein the maintenance operation comprises determining based at least in part on the wear data a write-in-place migration from a first non-volatile memory module to the first non-volatile memory module.

15. The system recited in claim 13, wherein the maintenance operation comprises determining based at least in part on the wear data a write-in-place migration from a first non-volatile memory module to a second non-volatile memory module.

16. The system recited in claim 14, wherein said set of device maintenance related data comprises location data of objects across two or more non-volatile memory modules.

17. The system recited in claim 16, wherein location data of objects includes physical layout data and three-dimensional disturb tracking along an X-axis, Y-axis, and Z-axis.

18. A method of storing data, comprising:
   receiving from each of a plurality of non-volatile memory modules a set of device maintenance related data;
   wherein each of the plurality of non-volatile memory modules comprise a plurality of low-latency non-volatile memory devices, wherein the set of device maintenance related data includes a write disturb count for each cell of a plurality cells of a low-latency non-volatile memory device;
   determining based at least in part on said set of device maintenance related data a maintenance operation to be performed, comprising:
      determining whether the write disturb count of a neighboring cell of a cell exceeds or is equal to a count limit wherein the count limit is selected based on a first neighboring cell or a second neighboring cell, wherein the count limit is updated based on a location of the neighboring cell on the low-latency non-volatile memory device, a temperature of the low-latency non-volatile memory device, and a version of 3D media;

and wherein the neighboring cell is an adjacent cell of the cell; and in response to a determination to that the write disturb count of the neighboring cell of the cell exceeds or is equal to the count limit, determining that the maintenance operation is to be performed; and performing the maintenance operation, comprising:
reading data in a block including the neighboring cell; and
re-writing the data into the block at an original block address of the block.

19. A computer program product for data storage, the computer program product being embodied in a non-transitory computer readable storage medium and comprising computer instructions for:

receiving from each of a plurality of non-volatile memory modules a set of device maintenance related data;

wherein each of the plurality of non-volatile memory modules comprise a plurality of low-latency non-volatile memory devices, wherein the set of device maintenance related data includes a write disturb count for each cell of a plurality cells of a low-latency non-volatile memory device;

determining based at least in part on said set of device maintenance related data a maintenance operation to be performed, comprising:

determining whether the write disturb count of a neighboring cell of a cell exceeds or is equal to a count limit wherein the count limit is selected based on a first neighboring cell or a second neighboring cell, wherein the count limit is updated based on a location of the neighboring cell on the low-latency non-volatile memory device, a temperature of the low-latency non-volatile memory device, and a version of 3D media;

and wherein the neighboring cell is an adjacent cell of the cell; and in response to a determination to that the write disturb count of the neighboring cell of the cell exceeds or is equal to the count limit, determining that the maintenance operation is to be performed; and performing the maintenance operation, comprising:
reading data in a block including the neighboring cell; and
re-writing the data into the block at an original block address of the block.

\* \* \* \* \*